(12) United States Patent
Schnee et al.

(10) Patent No.: US 12,327,467 B2
(45) Date of Patent: Jun. 10, 2025

(54) METHOD AND DEVICE FOR CHECKING THE PLAUSIBILITY OF AN ACCIDENT INVOLVING A TWO-WHEELED VEHICLE

(71) Applicant: Robert Bosch GmbH, Stuttgart (DE)

(72) Inventors: Jan Schnee, Weil im Schoenbuch (DE); Juergen Stegmaier, Wannweil (DE)

(73) Assignee: ROBERT BOSCH GMBH, Stuttgart (DE)

( * ) Notice: Subject to any disclaimer, the term of this patent is extended or adjusted under 35 U.S.C. 154(b) by 305 days.

(21) Appl. No.: 17/792,131

(22) PCT Filed: Jan. 19, 2021

(86) PCT No.: PCT/EP2021/051020
§ 371 (c)(1),
(2) Date: Jul. 11, 2022

(87) PCT Pub. No.: WO2021/151721
PCT Pub. Date: Aug. 5, 2021

(65) Prior Publication Data
US 2023/0085552 A1    Mar. 16, 2023

(30) Foreign Application Priority Data

Jan. 31, 2020  (DE) .................... 10 2020 201 221.0

(51) Int. Cl.
| | |
|---|---|
| *G08B 25/01* | (2006.01) |
| *B60R 21/013* | (2006.01) |
| *B62J 27/00* | (2020.01) |
| *B62J 50/20* | (2020.01) |
| *G07C 5/08* | (2006.01) |
| *G08B 29/18* | (2006.01) |
| *B60R 21/00* | (2006.01) |

(52) U.S. Cl.
CPC .......... *G08B 25/016* (2013.01); *B60R 21/013* (2013.01); *B62J 27/00* (2013.01); *B62J 50/20* (2020.02); *G07C 5/085* (2013.01); *G08B 29/185* (2013.01); *B60R 2021/0088* (2013.01)

(58) Field of Classification Search
CPC .. G08B 25/016; G08B 29/185; B60R 21/013; B62J 27/00; G07C 5/085
USPC ..................................................... 455/404.1
See application file for complete search history.

(56) References Cited

U.S. PATENT DOCUMENTS

| | | | |
|---|---|---|---|
| 2004/0036587 A1* | 2/2004 | Jefferson ................ | G08G 1/205 340/436 |
| 2015/0112883 A1* | 4/2015 | Orduna ................ | G06Q 50/265 705/325 |
| 2019/0147746 A1 | 5/2019 | Wernicke et al. | |

FOREIGN PATENT DOCUMENTS

| | | |
|---|---|---|
| CN | 106412308 A | 2/2017 |
| CN | 107662615 A | 2/2018 |

(Continued)

OTHER PUBLICATIONS

International Search Report for PCT/EP2021/051020 Issued Apr. 21, 2021.

*Primary Examiner* — Maria El-Zoobi
(74) *Attorney, Agent, or Firm* — NORTON ROSE FULBRIGHT US LLP

(57) ABSTRACT

A method for checking the plausibility of accident situations involving a two-wheeled vehicle, a device for carrying out this method, and a two-wheeled vehicle comprising a device of this kind. In the method, it is checked, i.e., reviewed, whether it is plausible to output the accident information, in order to avoid unnecessary or even incorrect calls for help.

19 Claims, 3 Drawing Sheets

(56) References Cited

FOREIGN PATENT DOCUMENTS

| DE | 102009036828 A1 * | 2/2011 | ............. A42B 3/046 |
| DE | 102018100191 A1 | 7/2018 | |
| EP | 3518200 A1 * | 7/2019 | ........... B60R 21/013 |
| EP | 3572292 A1 | 11/2019 | |
| WO | 2017025601 A1 | 2/2017 | |

* cited by examiner

METHOD AND DEVICE FOR CHECKING THE PLAUSIBILITY OF AN ACCIDENT INVOLVING A TWO-WHEELED VEHICLE

FIELD

The present invention relates to a method and to a device for checking the plausibility of an accident involving a two-wheeled vehicle, in particular an accident involving an electric bicycle.

BACKGROUND INFORMATION

A series of sensors fastened to a two-wheeled vehicle, for example a bicycle and in particular an electric bicycle, can be used to monitor both the operation of the two-wheeled vehicle and the riding situation. For instance, speed sensors can detect the wheel speed and the two-wheeled vehicle speed can be derived therefrom. Furthermore, inclination sensors, or acceleration sensors or angular rate sensors, can detect the tilting or inclination on the roadway, and sensors on the crank of a bicycle can detect the riding activity.

Critical situations or even accidents can be identified from the analysis of these detected sensor variables, for example by monitoring the behavior of these sensor variables over time. These identified critical situations or accidents can be used to automatically call for help or at least relay an item of information to third parties.

SUMMARY

An object of the present invention is to check the plausibility of the identified critical situations or accidents such that, in the event that an accident has been mistakenly identified, help is not unnecessarily called for or third parties are not unnecessarily disturbed.

The present invention provides a method for checking the plausibility of accident situations involving a two-wheeled vehicle, a device for carrying out this method, and a two-wheeled vehicle comprising a device of this kind. In this respect, the method is based on an accident situation being identified on the basis of at least one first sensor variable that represents the movement of at least one component that is fastened to the two-wheeled vehicle or can be temporarily or permanently fastened thereto. By way of example, the sensor variables can be those of a speed sensor on one of the wheels, or the sensor variables that can be derived from a sensor in the speedometer, in the human-machine interface (HMI), or in a smartphone. For example, it is possible for a smartphone to be fastened to the handlebars of the two-wheeled vehicle as a substitute speedometer such that the speed of the two-wheeled vehicle can be deduced using the acceleration sensor or angular rate sensor present in the smartphone. It goes without saying that the same applies if the rider of the two-wheeled vehicle is carrying the smartphone in the pocket of their clothes or on the pannier rack. In this case, it would be advantageous for the method according to the present invention to run directly on the smartphone. If a critical situation, and in particular an accident situation, is detected from the detected first sensor variables, the method or device, in particular the smartphone, can output an item of accident information. This accident information can optionally be transmitted to an emergency call center to call for help. Alternatively or additionally, a specific addressee can be informed so that they might also call for help. In accordance with the present invention, it is then checked, i.e., reviewed, whether it is plausible to output the accident information, in order to avoid unnecessary or even incorrect calls for help. In accordance with an example embodiment of the present invention, for this purpose, at least one second sensor variable is detected, which represents the movement of the two-wheeled vehicle, the operation thereof, and/or the status of the two-wheeled vehicle or even of the rider of the two-wheeled vehicle. In one specific case, it can also be physically the same sensor variable as detected for the identification or for generating or deducing the accident information. Optionally, the at least one second sensor variable may also be detected only after the accident information has been generated or deduced. However, at least one of the second sensor variables detected before the accident information was generated may also be drawn upon. On the basis of the detected at least one second sensor variable, it is decided whether to generate the accident information or whether to prevent it from being output and thus forwarded to third parties.

An advantage of the present invention is that events triggering the generation of an item of accident information are reviewed retrospectively so as to prevent incorrect calls for help.

In a particular configuration of the present invention, the at least one second sensor variable for reviewing the generated accident information is not detected until after the accident information has been generated or deduced. As a result, the movement of the two-wheeled vehicle, or of a component of the two-wheeled vehicle, and of the rider, and the operation and/or status of the two-wheeled vehicle can be detected in a targeted manner after a condition resulting in an item of accident information has arisen. If on the basis of this at least one second sensor variable it is identified that the accident information has been erroneously generated, e.g., because the first detected sensor variable that triggered the accident information was not caused by an accident, the accident information can be prevented from being output.

In accordance with an example embodiment of the present invention, it is possible to identify an incorrectly generated item of accident information, or the generation of accident information on the basis of at least one first sensor variable, by comparing the second sensor variable with a threshold value and/or a database. If during this comparison the method according to the present invention identifies that the originally identified accident situation was erroneously identified, the accident information is prevented from being generated and/or output. In the process, it can be identified, for example by way of the at least one second sensor variable, that the at least one first sensor variable that triggered the generation of the accident information was also generated by a situation that is not associated with an accident. Corresponding threshold values and/or databases or comparison tables can be stored in a memory in the corresponding analysis unit of the device according to the present invention.

In a development of the present invention, the behavior of the first and/or second sensor variable over time is detected in order to identify the accident situation, generate or output the accident information, or prevent the accident information from being output or generated. In this case, in particular the change in the first and/or second sensor variable over time can be taken into account. The behavior of the first and/or second sensor variable over time, or the change therein over time, can also be used for the comparison with a threshold value or the content of a database. In addition, the behavior of the first and/or second sensor variable specifically within a certain or predetermined time period can be taken into account in order to identify the accident situation or to identify that the identified situation does not actually represent an accident, crash, or collision.

By way of example, acceleration and/or angular rate sensor variables are suitable as the first and/or second sensor variables. In this case, from a rotational movement of the components which detect said acceleration and/or angular rate variable it can be concluded that the movement of the two-wheeled vehicle is unnatural for normal operation so as to deduce that an accident has occurred. However, if further second sensor variables that check the plausibility of the movement are added, by taking account of the second sensor variables it is also possible to identify a situation that does not represent an accident. For example, by way of a smartphone fastened to the handlebars, the sensors found in said device can be used to identify an accident situation, generate or output an item of accident information, prevent the accident information from being generated or sent out, or transmit a call for help via radio on the basis of an item of accident information of which the plausibility has been checked.

An accident can be detected, for example, by monitoring an acceleration signal in the longitudinal direction, i.e., the travel direction, of the two-wheeled vehicle. In this case, abrupt braking may be sufficient to identify that the sudden stopping of the two-wheeled vehicle represents an accident situation. Optionally, in addition to the at least one first sensor variable, the satisfaction of a further condition can be checked in order to identify the actual accident situation and thus generate or output the accident information. In this case, it would be possible, for example, to detect the riding activity in a bicycle or even the sideways inclination. For example, the accident situation can be confirmed even when the two-wheeled vehicle is in an entirely stationary state, as detected by way of the at least one second sensor variable, with the accident information then being generated and/or output. In this case, therefore, the accident information is not prevented from being output. However, if the two-wheeled vehicle is accelerated again in the longitudinal direction, e.g., in a way that is typical of the riding activity of the two-wheeled vehicle, after the identified accident situation, which has been identified on the basis of the at least one first sensor variable and possibly other additional conditions, it can be assumed that the stationary state was only temporary and there is no accident situation. In this case, the accident information is prevented from being generated or output.

In accordance with an example embodiment of the present invention, typical suitable second sensor variables that can be used to verify the accident situation, i.e., to review it or check the plausibility thereof, are a rotational speed of the two-wheeled vehicle about at least one axis, e.g., the longitudinal and/or transverse axis, an orientation of the two-wheeled vehicle, the inclination angle, in particular sideways, a pedaling rate, a rider pedaling torque on the crank, power input by the rider on the pedals, or any other rider interaction that depicts normal operation of the two-wheeled vehicle. It goes without saying that the change over time for each of these variables can also be used to check the plausibility of the identification of the accident situation, in order to prevent the accident information from being generated or output where applicable.

In a particular configuration of the present invention, the method for checking the plausibility of the identification of the accident situation only has a predetermined time period in which to prevent the accident information from being generated or output. The advantage of this is that an item of accident information is always output in the absence of a negative confirmation of the identification of an accident situation. This approach is advantageous in that a call for help can be transmitted whenever there is no unambiguous confirmation that an accident has been incorrectly identified.

The at least one first sensor variable, and optionally also the detection of the further condition which leads to the accident situation being identified or the accident information being generated, can continue to be detected after the accident situation has been identified or after the accident information has been generated. In this case, the accident information can be prevented from being output depending on the subsequently detected first and second sensor variable. In particular, it is possible to compare the variation or change of the first sensor variable over time both before and after the accident situation is identified or the accident information is generated. In the process, the accident information is prevented from being output if the comparison delivers a difference that is above a threshold value, i.e., is sufficiently large. By way of example, the difference can be in the form of a change to the average or integral of the first sensor variable.

The present invention is intended to be applied to two-wheeled vehicles. The method or the described device can be used in both an electric bicycle and a conventional bicycle. Use in motorcycles is also possible.

Further advantages will become clear from the following description of exemplary embodiments and from the figures.

DETAILED DESCRIPTION OF EXAMPLE EMBODIMENTS

Figure 1:
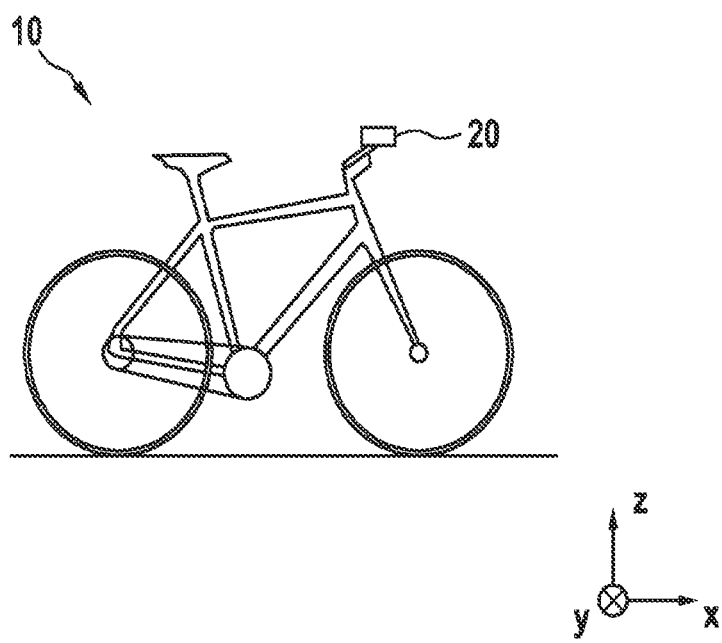
FIG. 1 schematically shows a two-wheeled vehicle 10 including a mobile terminal 20 and a coordinate system in which the two-wheeled vehicle moves during normal riding activity.
Figure 2:
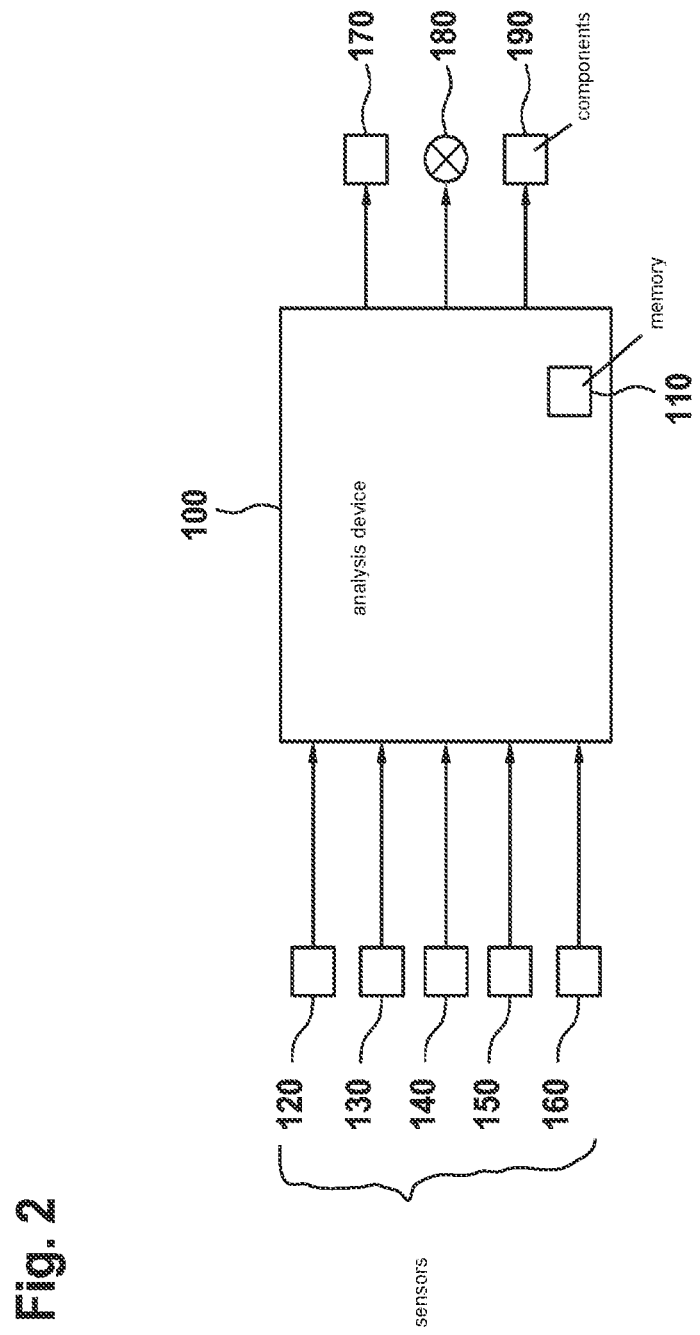
FIG. 2 shows a possible implementation of a device according to an example embodiment of the present invention.

The block diagram in FIG. 2 shows an analysis means 100, e.g., an analysis unit or a microprocessor, which has a memory 110. The analysis means 100 is able to carry out the method according to the present invention for checking the plausibility of, or verifying or reviewing, an identification or detection of an accident situation. In the process, the analysis means 100 or the method according to the present invention running thereon can also classify the identified accident situation or crash/accident or collision. This classification can entail identifying whether a call for help has to be transmitted for the identified accident situation and also identifying the type of call for help. The memory 110 can include comparative values, threshold values, or databases for particular specific embodiments of the present invention, and these can be used to identify an accident situation or deduce accident information. Furthermore, the plausibility of the identified accident situations can also be checked using said stored values, and the generated accident information can then be prevented from being output. The memory 110 can likewise contain information or comparative values which can be used to both evaluate and classify the accident situation. Optionally, the memory 110 can also include relevant emergency contact numbers, addresses, or names which have to be reached or notified in the event of a properly identified accident situation.

To identify the accident situation, the analysis means 100 detects at least one first sensor variable of a first sensor 120. To check the plausibility of, or review, the accident situation, or also to check the extent to which an item of accident information is generated or output, the analysis means 100 detects at least one second sensor variable, which can originate from both the first sensor 120 and a further, second sensor 130. To identify the accident situation and check the plausibility of the identified accident situation, the analysis means 100 can also access sensor variables of further sensors or input variables from input means 140 to 160.

To identify an accident situation, it is expedient to detect an angular rate as the first sensor variable using the first sensor 120. This angular rate can include all three spatial directions, or, in the case of a two-wheeled vehicle, it can map the main rotations about the longitudinal axis in the travel direction and the vertical axis. It is also possible to detect just one axis, e.g., the longitudinal axis, and to map the rotational movement about the vertical axis using further sensor variables, if necessary. Optionally, acceleration variables may also be detected using the first sensor. These too can be detected either in one direction or in two or three directions in order to identify an accident situation. In general, one or more sensor variables depicting both the movement and behavior of the two-wheeled vehicle can also be detected to verify the accident situation. A sensor 140 that detects the speed can be used for this purpose, or a sensor 150 that detects the pedaling movement on the crank, e.g., the pedaling speed, the pedaling torque, or the pedaling force on the pedals. In addition, at least one sensor 160 for detecting an inclination of the two-wheeled vehicle, an angle in relation to the roadway, an item of GPS information, an item of navigation information, or a weight sensor can be provided, which sensor sends out corresponding data or sensor variables to the analysis means 100. Optionally, an input means (device) by which a rider interaction can be detected and fed to the analysis means 100 may also be queried.

The analysis means 100 can identify the accident situation on the basis of one or more sensor variables and, if necessary, generate an item of accident information. In the process, successive sensor variables, or the change therein, can also be detected. To check the plausibility of, or verify, the identification of the accident situation, at least one second sensor variable can be detected, which can be used to review whether the triggering of the identification on the basis of the at least one first sensor variable might be incorrect. For this purpose, a sensor variable representing the same type of sensor as used for the detection of the first sensor variable can also be detected. For instance, it is possible to also detect an angular rate or an acceleration for the purpose of the plausibility check. In general, therefore, each sensor variable of the sensors 120 to 160, or an input of an input means, and of course their variation or change over time too, may also be detected for the purpose of the plausibility check. Optionally, the at least one second sensor variable may not be detected until after the accident situation has been identified in the analysis means 100, e.g., by only starting the plausibility check process, and thus the process of detecting the second sensor variable, when or after the accident situation has been identified or the accident information has been generated. However, it is also possible to draw on at least some of the sensor variables from before the accident situation was identified.

Once the accident situation has been identified or the accident information has been generated, third parties 130 can be informed. In this case, the third party can be an emergency call center or a specific person who is informed about the accident. As a result, help can be called for without the rider having to make any active intervention. The advantage of this is that the emergency call is transmitted in major accidents even if the rider is no longer able to request this help or cannot do so without delay. Alternatively or additionally, an indicator 180 can also be actuated to indicate the accident to the rider or a third party. Optionally, certain components 190 of the two-wheeled vehicle can be actuated when an accident situation is identified in order to reduce the danger for the rider of the two-wheeled vehicle or other people involved. For example, it would be expedient to switch off an electric motor in an electric bicycle to prevent the bicycle from being propelled further forward unintentionally after an accident. However, it is also possible for the brakes and/or the lights of the two-wheeled vehicle to be activated automatically in the event of an accident situation or even an impending accident situation.

Using the method to be described further below, it is identified whether the accident situation, which is based on the at least one first sensor variable, actually correlates with an accident, crash, or collision. It is also possible to categorize the accident situation by taking account of at least one second sensor variable such that help is called for only in accidents in which help of this kind is needed. Therefore, if no help is required, the accident information is prevented from being generated and/or the accident information is prevented from being output to third parties. By way of example, an item of accident information can be prevented from being output in this way in the event of an accident in which external help is not needed or in which the sensor variable that triggered the accident identification represents a different situation. For example, removing a smartphone from a holder on the handlebars of the two-wheeled vehicle may also generate sensor variables that correspond to the smartphone being thrown off. However, since operating states or behavior patterns of the two-wheeled vehicle and/or of the rider confirm normal operation after the removal, there is no need to call for help in this case.

Figure 3:
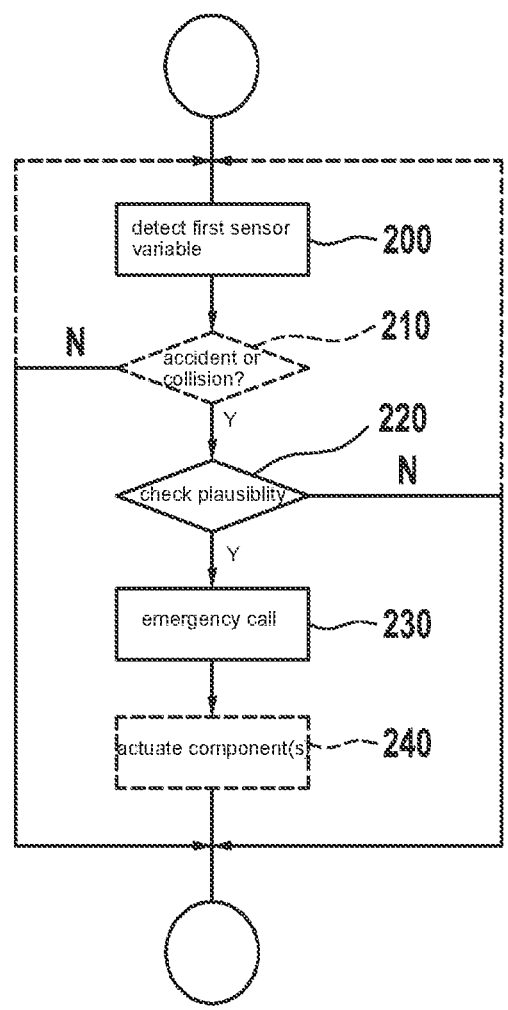
FIG. 3 shows a possible exemplary embodiment of the method according to the present invention.

The flowchart shown in FIG. 3 describes the method according to the present invention in one possible specific embodiment. After the method begins in a first step 200, at least one first sensor variable is detected, using which it is possible to detect an accident, crash, or collision of the two-wheeled vehicle. The first sensor variable can, for example, be an angular rate in at least one spatial direction of a component that is fastened or fastenable to the two-wheeled vehicle, e.g., a speedometer or a smartphone. As set out above, an acceleration, a speed, and/or a rider interaction on the crank may also be detected as the first sensor variable, possibly in addition to the angular rate. Optionally, an angular rate, an acceleration, or a speed of a device being held or carried by the rider of the vehicle may also be detected as the first sensor variable. For the detected at least one first sensor variable in step 200, it is essential that the sensor variable detected in this manner detects the behavior, operation, and/or status of the two-wheeled vehicle and/or of the rider, and optionally also the corresponding dynamic behavior. In the next step 210, it is deduced, on the basis of the at least one first sensor variable, possibly plus additional sensor or input information, whether an accident situation, crash, and/or collision of the two-wheeled vehicle has occurred. In the process, the accident situation can also be categorized on the basis of the available sensor variables. If an accident situation is not identified or the accident situation is not linked to the need for an emergency call, the method is terminated or run again from step 200. Optionally, steps 200 and 210 can form a separate method that can be run through independently from the actual plausibility check after steps 220 et seq.

When an accident situation is identified, in particular a situation that entails an item of accident information and/or an emergency call being sent out, the plausibility of the identified accident situation is checked in step 220. For this purpose, in step 220, or a further detection step immediately before step 220, at least one second sensor variable can be detected, which can be used to check the plausibility of, i.e., review, the identified accident situation. Optionally, second sensor variables that have already been detected in step 200 may also be drawn on in step 220. Possible second sensor variables can be the same sensor variables as detected for the first sensor variable, or expanded sensor variables that make it possible to verify the movement, status, or operation of the two-wheeled vehicle. In this case, an angular rate, an acceleration, a speed, a pedaling rate, a rider pedaling torque on the crank, or an inclination of the two-wheeled vehicle are possible, for example. As set out above, once the at least one second sensor variable is detected, the identification of the accident situation or the generation of the accident information can begin. Alternatively, the at least one second sensor variable can also be detected constantly, e.g., dynamically, or can originate from a time period before the accident situation was detected. If a situation that goes against the identification of an accident situation is found in step 220, the method is terminated or run again from step 200. In this case, no accident information is generated, or any accident information that has already been generated is not used to transmit an emergency call. If, on the other hand, the accident situation is confirmed in step 220, for example by the other second sensor variables, an emergency call is transmitted in step 230 in order to call for help. Additionally, it can optionally be provided in step 220 that step 230 is also carried out, i.e., an emergency call is transmitted, when the second sensor variables do not confirm, within a predetermined time period, that the identification of the accident situation was mistakenly triggered.

In a further specific embodiment of the present invention, in a subsequent step 240, i.e., after the identification of an accident situation in step 220 has been confirmed, one or more components of the two-wheeled vehicle are actuated to mitigate the consequences of an accident or the collision or to make other road users aware of it. For example, the motor of an electric bicycle can be switched off, a brake and/or light system can be actuated, or an airbag can be triggered.

A typical event in which no accident has occurred despite corresponding first sensor variables having been detected may occur, for example, if the rider removes the speedometer, an HMI, or a smartphone from the handlebars. In this case, the components in question often undergo a rotational movement which, without the additional information regarding the removal, implies a rotation of the two-wheeled vehicle. By way of example, therefore, when detecting the orientation of the two-wheeled vehicle, it can be detected at the same time whether the orientation of the two-wheeled vehicle also changes. If the two-wheeled vehicle remains upright and/or is still moving at a typical, or in particular identical, speed in the same direction as before, it can be concluded that the accident identification was mistakenly triggered. For example, the orientation of the two-wheeled vehicle can indicate tipping over in which the speed can be explained by the (rear) wheel coming to a stop. In this case, either an accident can be identified or the intentional setting down of the vehicle can be identified using further sensor variables. On the other hand, if tipping at a constant or alternating speed is identified, for example due to acceleration and deceleration processes, normal operation can be identified. In this case, the accident identification would need to be characterized as erroneous. It can also be concluded that said identification was mistakenly triggered if valid rider interactions are detected, e.g., a pedaling rate, a rider pedaling torque on the crank, or generally any plausible power input by the rider after the suspected identified accident situation. In this case, it is appropriate for the accident information to be prevented from being generated or forwarded. Another option for ruling out an accident situation is to monitor the behavior of the first and/or second sensor variable over time for a predeterminable or predetermined time period. For instance, it is possible that no riding activity would be discernible after an identified accident situation, e.g., due to the two-wheeled vehicle having tipped over. In this case, it is likely that the two-wheeled vehicle has fallen out of its stand and no emergency has occurred. Additionally, this situation can be corroborated by further sensor variables if, for example, a weight sensor on the saddle has not identified any rider weight or the crank has not been moved.

On the other hand, an accident situation can be deduced, along with the subsequent necessary assistance measures, if in a typical operating scenario no movement whatsoever of the two-wheeled vehicle or of the rider is identified after the identified accident. It is also possible for the identified accident situation to be classified and for the accident information to be prevented from being generated or output only in certain categories. For instance, an emergency situation in which help has to be called for immediately can generally be assumed in the event of particularly severe accidents. By way of example, a force sensor on the frame of the two-wheeled vehicle that detects deformation of the frame can optionally also play a role in this case. It would also be possible to have a link to the rider's vital signs, which indicate that the rider's health has been impaired. In addition, the movement profile of the two-wheeled vehicle or of the corresponding components can unambiguously indicate an accident if, for example, sharp, in particular short, accelerations counter to the original movement direction are detected.

What is claimed is:

1. A method for checking plausibility of an accident situation involving a two-wheeled vehicle, comprising the following steps:
    detecting at least one first sensor variable which represents a movement of at least one component fastened to the two-wheeled vehicle;
    generating or output, based on the at least one first sensor variable, an item of accident information that represents an accident situation;
    checking the plausibility of the accident situation by detecting at least one second sensor variable which represents a movement, and/or an operation, and/or a status of the two-wheeled vehicle; and
    preventing an item of accident information from being output based on the at least one second sensor variable, wherein an angular rate sensor variable is detected as the first and/or second sensor variable, the accident information being output by a smartphone and based on a rotational movement of the smartphone.

2. The method as recited in claim 1, wherein the two-wheeled vehicle is an electric bicycle.

3. The method as recited in claim 1, where the detecting of the at least one second sensor variable occurs after the accident information has been generated.

4. The method as recited in claim 1, further comprising:
comparing the at least one second sensor variable with a threshold value and/or with content of a database; and
preventing the accident information from being output based on the comparison.

5. The method as recited in claim 1, wherein the first and/or second sensor variable is detected over time, the accident information being generated or output based on a comparison of a variation of the first and/or second sensor variable over time with a threshold value or content of a database.

6. The method as recited in claim 1, wherein an acceleration variable is detected as the first and/or second sensor variable, the accident information being output based on an acceleration of components of the two-wheeled vehicle in a travel direction of the two-wheeled vehicle.

7. The method as recited in claim 1, wherein the accident information is output when the at least one second sensor variable represents a stationary state of the two-wheeled vehicle.

8. The method as recited in claim 1, wherein, as the second sensor variable, at least one of the following is detected:
a rotational speed of the two-wheeled vehicle about a longitudinal and/or transverse axis, and/or
an orientation of the two-wheeled vehicle, and/or
an inclination angle of the two-wheeled vehicle, and/or
a pedaling rate, and/or
a rider pedaling torque on the crank, and/or
power input by the rider on the pedals, and/or
a rider interaction.

9. The method as recited in claim 1, wherein the plausibility of the accident situation is checked to prevent the generated accident information from being output for a predetermined time period, and the accident information is not prevented from being output once the predetermined time period has elapsed.

10. The method as recited in claim 1, wherein the at least one first sensor variable continues to be detected after the accident information has been generated, and the item of accident information is prevented from being output based on the at least one first and second sensor variable.

11. The method as recited in claim 10, further comprising:
comparing a variation of the first sensor variable over time both before and after the accident information is generated; and
prevents the accident information from being output when the comparison delivers a difference that is above a threshold value.

12. A device for generating an item of accident information, comprising:
an analysis unit configured to:
detect at least one first sensor variable which represents s movement of at least one component fastened to the two-wheeled vehicle;
generate or output, based on the at least one first sensor variable, an item of accident information that represents an accident situation;
check plausibility of the accident situation by detecting at least one second sensor variable which represents a movement, operation, and/or status of the two-wheeled vehicle; and
prevent an item of accident information from being output based on the at least one second sensor variable,
wherein an angular rate sensor variable is detected as the first and/or second sensor variable, the accident information being output by a smartphone and based on a rotational movement of the smartphone.

13. The device as recited in claim 12, wherein the analysis unit is configured to detect the at least one second sensor variable after the accident information has been generated.

14. The device as recited in claim 12, wherein the analysis unit is configured to detect a change in the first and/or second sensor variable over time, the analysis unit configured to generate or output the accident information based on a comparison of the variation of the first and/or second sensor variable over time with a threshold value or content of a database.

15. The device as recited in claim 12, wherein the analysis unit is configured to check the plausibility of the accident situation to prevent the generated accident information from being output for a predetermined time period, the analysis unit being configured to not prevent the accident information from being output once the predetermined time period has elapsed.

16. The device as recited in claim 12, wherein the analysis unit is configured to continue to detect the at least one first sensor variable after the accident information has been generated, and prevent the item of accident information from being output based on t the at least one first and second sensor variable.

17. The device as recited in claim 16, wherein the analysis unit is configured to:
compare the variation of the first sensor variable over time both before and after the accident information is generated, and
prevent the accident information from being output when the comparison delivers a difference that is above a threshold value.

18. The device as recited in claim 12, wherein the two-wheeled vehicle is an electric bicycle.

19. A two-wheeled vehicle, comprising:
a device for generating an item of accident information, comprising:
an analysis unit configured to:
detect at least one first sensor variable which represents s movement of at least one component fastened to the two-wheeled vehicle;
generate or output, based on the at least one first sensor variable, an item of accident information that represents an accident situation;
check plausibility of the accident situation by detecting at least one second sensor variable which represents a movement, operation, and/or status of the two-wheeled vehicle; and
prevent an item of accident information from being output based on the at least one second sensor variable; and
at least one sensor configured to detect the first and/or the second sensor variable,
wherein an angular rate sensor variable is detected as the first and/or second sensor variable, the accident information being output by a smartphone and based on a rotational movement of the smartphone.

* * * * *